United States Patent
Sobanski (10) Patent No.: US 11,448,096 B2
(45) Date of Patent: Sep. 20, 2022

(54) VANE ARC SEGMENT SUPPORT PLATFORM WITH CURVED RADIAL CHANNEL

(71) Applicant: RAYTHEON TECHNOLOGIES CORPORATION, Farmington, CT (US)

(72) Inventor: Jon E. Sobanski, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/150,252

(22) Filed: Jan. 15, 2021

(65) Prior Publication Data

US 2022/0228509 A1 Jul. 21, 2022

(51) Int. Cl.
*F01D 25/28* (2006.01)
*F01D 9/04* (2006.01)
*F02C 3/04* (2006.01)

(52) U.S. Cl.
CPC ............ *F01D 25/28* (2013.01); *F01D 9/041* (2013.01); *F02C 3/04* (2013.01); *F05D 2220/32* (2013.01);
(Continued)

(58) Field of Classification Search
CPC . F01D 25/28; F01D 9/041; F02C 3/04; F05D 2220/32; F05D 2240/12; F05D 2240/35
See application file for complete search history.

(56) References Cited

U.S. PATENT DOCUMENTS 8,292,580 B2 * 10/2012 Schiavo ................. F01D 5/189
416/96 A
10,072,516 B2 9/2018 Carr et al.
(Continued)

FOREIGN PATENT DOCUMENTS

EP 3000979 3/2016
EP 3121379 1/2017
(Continued)

OTHER PUBLICATIONS

European Search Report for European Patent Application No. 22151409.4 dated Mar. 15, 2022.

*Primary Examiner* — Jesse S Bogue
(74) *Attorney, Agent, or Firm* — Carlson, Gaskey & Olds, P.C.

(57) ABSTRACT

A support system for an airfoil piece in a gas turbine engine includes first and second support platforms for supporting the airfoil piece there between. Each of the support platforms defines a forward support platform side, an aft support platform side, a first support platform circumferential side, a second support platform circumferential side, an airfoil side, and a non-airfoil side. The airfoil side of at least one of the support platforms has a radial channel therein for receiving a complementary radial flange of the airfoil piece. Each radial channel includes a radial channel first leg portion extending adjacent the aft support platform side, a radial channel second leg portion that extends from the radial channel first leg portion and that curves toward the forward support platform side, and a radial channel third leg portion that extends from the second leg portion toward the forward support platform side.

19 Claims, 6 Drawing Sheets

(52) U.S. Cl.
 CPC ...... *F05D 2240/12* (2013.01); *F05D 2240/35* (2013.01); *F05D 2240/90* (2013.01)

(56) References Cited

U.S. PATENT DOCUMENTS

| | | | |
|---|---|---|---|
| 10,107,117 B2 * | 10/2018 | Carr | F01D 25/246 |
| 10,309,240 B2 | 6/2019 | Heitman et al. | |
| 10,774,665 B2 * | 9/2020 | Greene | F01D 11/005 |
| 10,890,076 B1 * | 1/2021 | Whittle | F01D 25/005 |
| 11,125,093 B2 * | 9/2021 | Dube | F01D 9/041 |
| 11,174,794 B2 * | 11/2021 | Sunnarborg | F01D 11/005 |
| 2021/0207486 A1 * | 7/2021 | Sadler | F01D 9/042 |

FOREIGN PATENT DOCUMENTS

| | | |
|---|---|---|
| EP | 3214276 | 9/2017 |
| EP | 3892822 | 10/2021 |
| JP | S63223302 | 9/1988 |

* cited by examiner

VANE ARC SEGMENT SUPPORT PLATFORM WITH CURVED RADIAL CHANNEL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane support system according to an example of the present disclosure includes first and second support platforms for supporting an airfoil piece there between. Each of the first and second support platforms defines a forward support platform side, an aft support platform side, a first support platform circumferential side, a second support platform circumferential side, an airfoil side, and a non-airfoil side. The airfoil side of at least one of the first or second support platform has a radial channel therein for receiving a complementary radial flange of the airfoil piece. The radial channel includes a radial channel first leg portion that extends adjacent the aft support platform side, a radial channel second leg portion that extends from the radial channel first leg portion and curves toward the forward support platform side, and a radial channel third leg portion that extends from the second leg portion toward the forward support platform side.

In a further example of any of the foregoing examples, the first support platform has a hollow spar leg that extends therefrom, and an end portion of the hollow spar leg is secured to the second support platform.

In a further example of any of the foregoing examples, the second support platform has a through-hole through which the end portion of the hollow spar leg extends.

In a further example of any of the foregoing examples, the radial channel has terminal ends that open at, respectively, the first circumferential side and the forward side.

In a further example of any of the foregoing examples, the radial channel first leg portion is parallel to the aft support platform side.

In a further example of any of the foregoing examples, the support platform third leg portion is parallel to the second support platform circumferential side.

In a further example of any of the foregoing examples, the radial channel of the first support platform is a single, exclusive radial channel of the first support platform, and the radial channel of the second support platform is a single, exclusive radial channel of the second support platform.

In a further example of any of the foregoing examples, the first support platform has a hollow spar leg that extends therefrom, the second support platform has a through-hole through which an end portion of the hollow spar leg extends, and the end portion of the hollow spar leg is secured to the second support platform.

A vane arc segment according to an example of the present disclosure includes an airfoil piece that defines first and second airfoil platforms and an airfoil section that extends between the first and second airfoil platforms. The airfoil section has a trailing edge, a leading edge, a pressure side, and a suction side. The first and second airfoil platforms each define a first airfoil platform circumferential side, a second airfoil platform circumferential side, a forward airfoil platform side, and an aft airfoil platform side, a gaspath side, a non-gaspath side, and the non-gaspath side of at least one of the first or second airfoil platforms has a radial flange projecting there from. The radial flange extends continuously and includes a flange first leg portion that extends adjacent the trailing edge, a flange second leg portion that extends from the flange first leg portion and curves around the suction side, and a flange third leg portion that extends from the flange second leg portion toward the forward side. A vane support system includes first and second support platforms that support the airfoil piece there between. Each of the first and second support platforms defines a support platform forward side, a support platform aft side, a first support platform circumferential side, a second support platform circumferential side, an airfoil side, and a non-airfoil side. The airfoil side of at least one of the first or second support platforms has a radial channel therein. The radial channel is complementary to the radial flange so as to receive the radial flange therein.

In a further example of any of the foregoing examples, the radial channel defines a first side proximate the airfoil section, a second side distal from the airfoil section, the radial flange bears against the second side, and there is an expansion gap between the radial flange and the first side of the radial channel.

In a further example of any of the foregoing examples, the radial channel defines a channel turn having a channel turn radius R1, and the radial flange defines a flange turn having a flange turn radius R2, and R1 is less than R2 such that the is a corner gap between the radial channel at the flange turn and the second side of the radial channel at the channel turn.

In a further example of any of the foregoing examples, the airfoil piece is ceramic matrix composite.

In a further example of any of the foregoing examples, the first support platform has a hollow spar leg that extends therefrom, and an end portion of the hollow spar leg is secured to the second support platform.

In a further example of any of the foregoing examples, the second support platform has a through-hole through which the end portion of the hollow spar leg extends.

In a further example of any of the foregoing examples, the radial channel has terminal ends that open at, respectively, the first support platform circumferential side and the forward support platform side.

In a further example of any of the foregoing examples, the radial channel first leg portion is parallel to the aft support platform side.

In a further example of any of the foregoing examples, the support platform third leg portion is parallel to the second support platform circumferential side.

In a further example of any of the foregoing examples, the radial channel is a single, exclusive radial channel of the first or second support platform.

In a further example of any of the foregoing examples, the first support platform has a hollow spar leg that extends therefrom, the second support platform has a through-hole through which an end portion of the hollow spar leg extends, and the end portion of the hollow spar leg is secured to the second support platform.

A gas turbine engine according to an example of the present disclosure includes a compressor section, a combustor in fluid communication with the compressor section, and a turbine section in fluid communication with the combustor. The turbine section has vane arc segments according to any of the foregoing examples.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
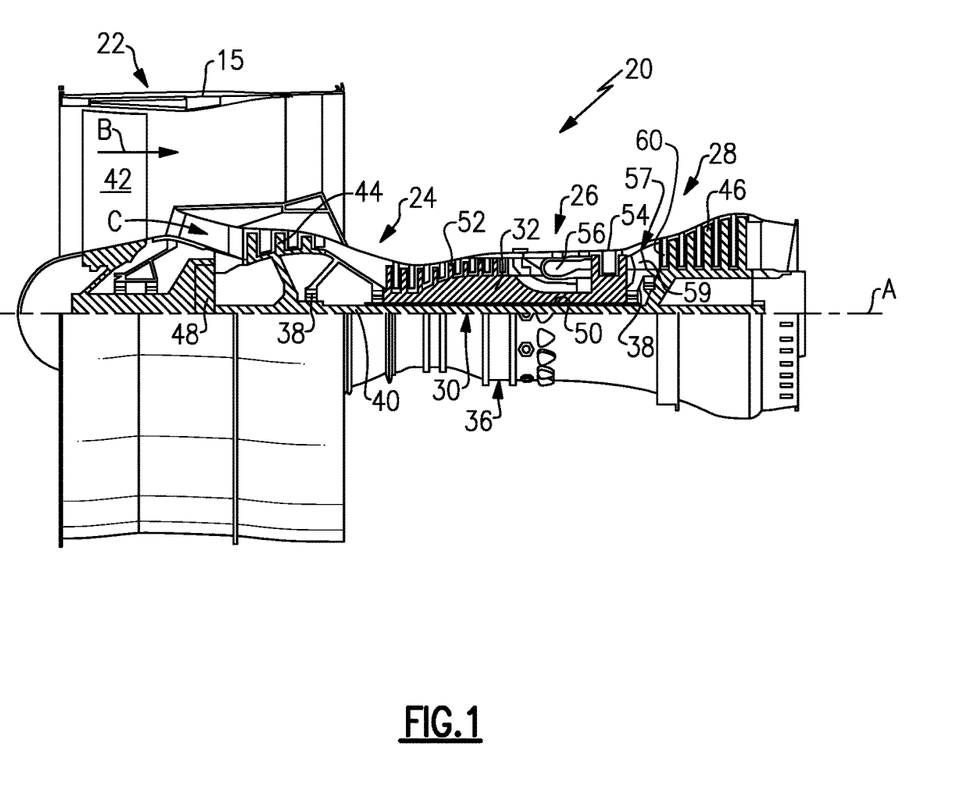
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
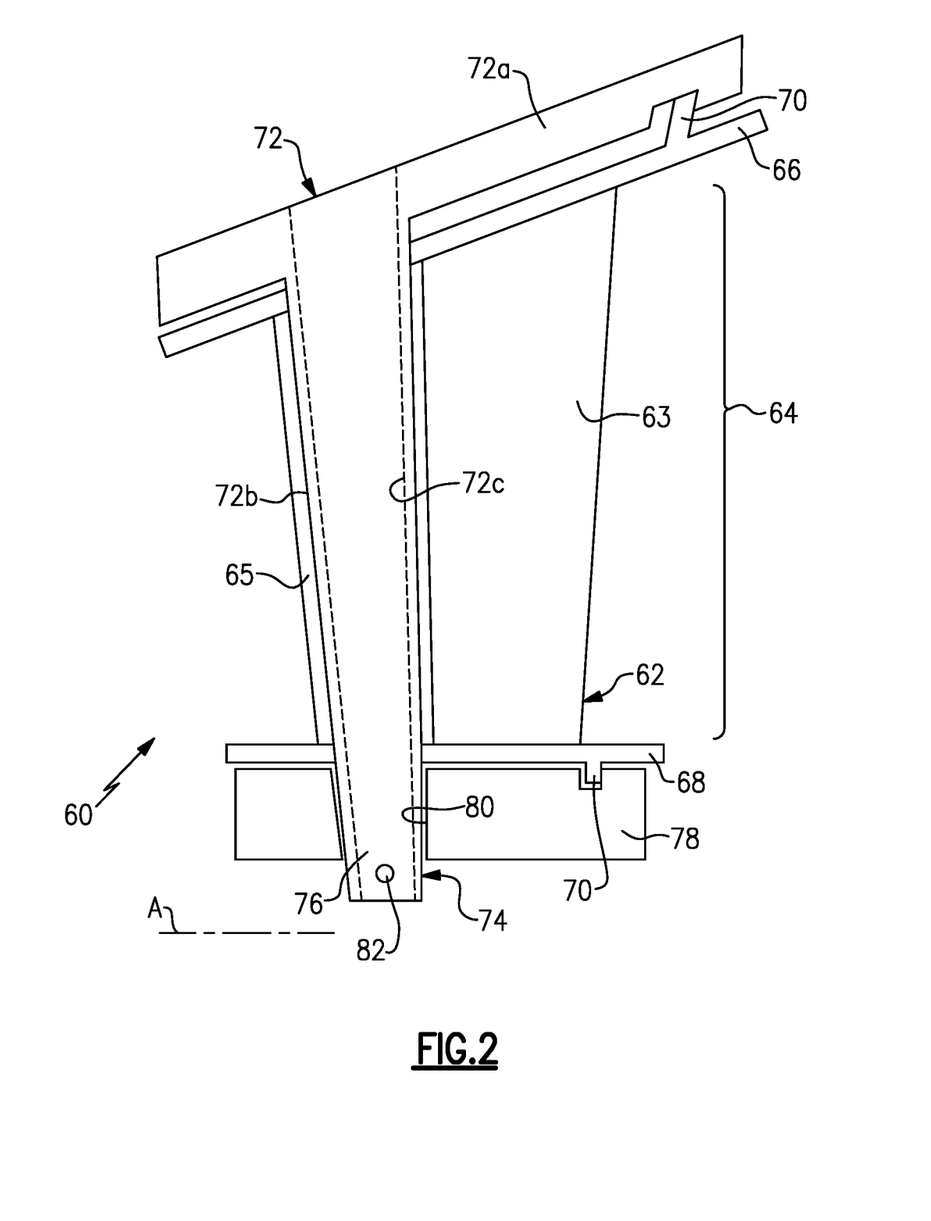
FIG. 2 illustrates a view of an example vane arc segment.

FIG. 2 illustrates a line representation of a vane arc segment 60 of a vane ring assembly from the turbine section 28 of the engine 20. A plurality of vane arc segments 60 are situated in a circumferential row about the engine central axis A. Although the vane arc segment 60 is shown and described with reference to application in the turbine section 28, it is to be understood that the examples herein are also applicable to structural vanes in other sections of the engine 20.

The vane arc segment 60 is generally comprised of an airfoil piece (a fairing) 62 and a support system (spar 72 and support platform 78) for the airfoil piece 62. The airfoil piece 62 includes several sections, including first and second platforms 64/66 and an airfoil section 68 that extends between the first and second platforms 64/66.

Figure 3:
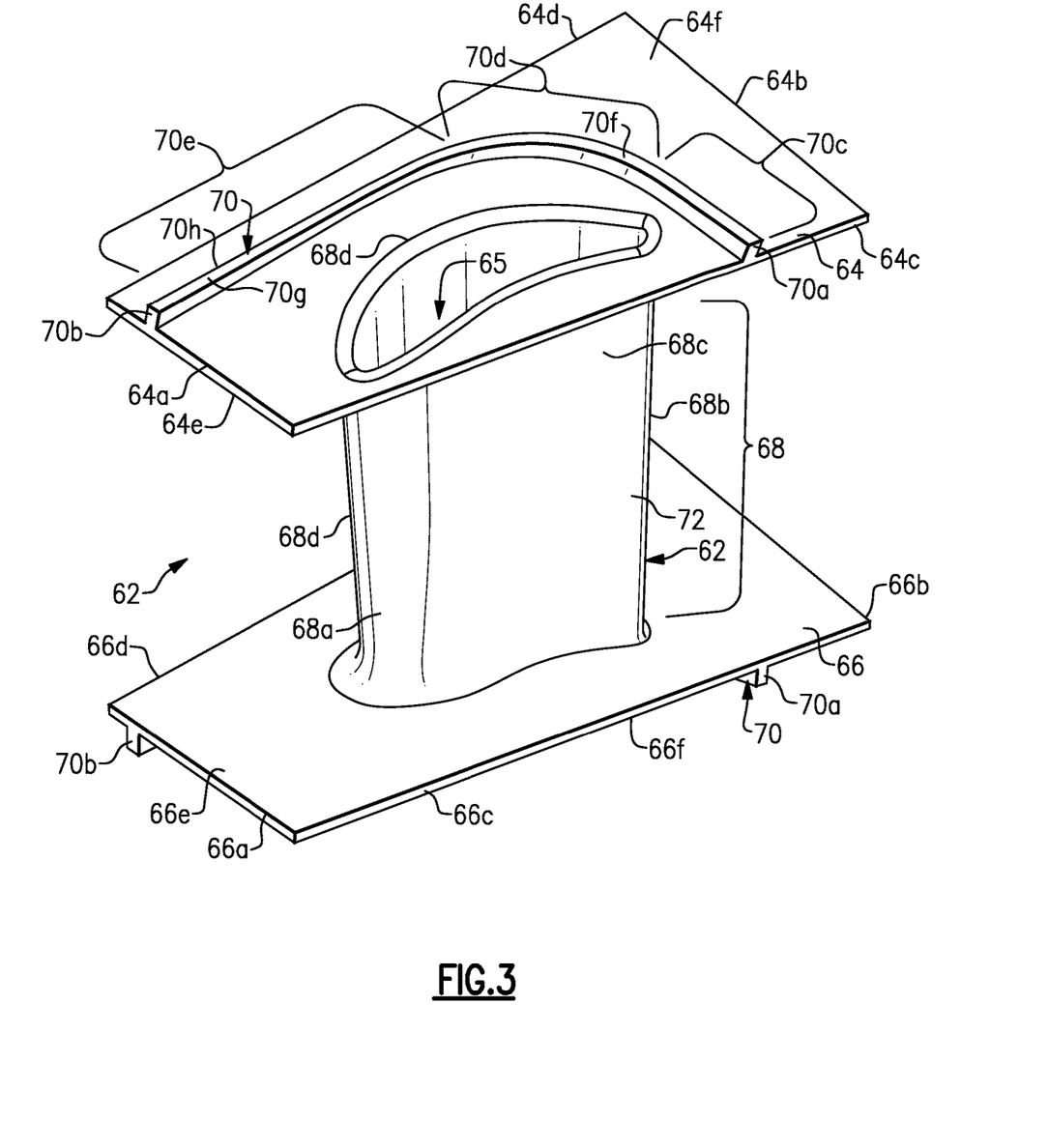
FIG. 3 illustrates an isolated view of an airfoil piece of the vane arc segment.
Figure 4:
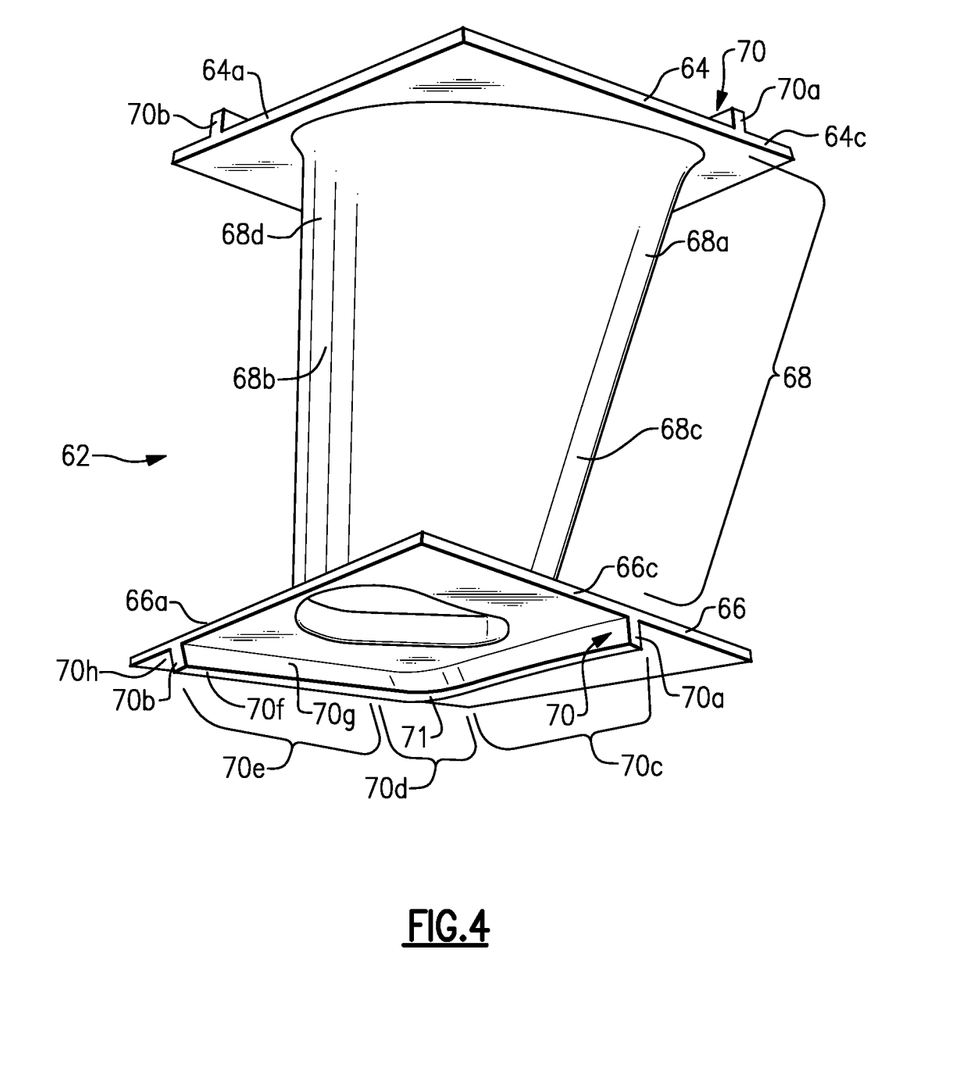
FIG. 4 illustrates another view of the airfoil piece.

FIGS. 3 and 4 show different angled isolated views of the airfoil piece 62. The airfoil section 68 defines a leading edge 68a, a trailing edge 68b, and pressure and suction sides 68c/68d that generally circumscribe a central through-cavity 65 such that the airfoil section 68 in this example is hollow. As shown, the through-cavity 65 is a single cavity, although it may alternatively have one or more ribs that divide the through-cavity cavity 65 into two or more sub-cavities.

In this example, the first platform 64 is a radially outer platform and the second platform 66 is a radially inner platform. Terms such as "inner" and "outer" refer to location with respect to the central engine axis A, i.e., radially inner or radially outer. The terminology "first" and "second" as used herein is to differentiate that there are two architecturally distinct components or features. It is to be understood that the terms "first" and "second" are interchangeable in the embodiments herein in that a first component or feature could alternatively be termed as the second component or feature, and vice versa.

The first platform 64 defines forward and aft (axial) sides 64a/64b, first and second circumferential mate faces 64c/64d, a gaspath side 64e, and a non-gaspath side 64f. The "gaspath" is reference to the core flow path C through the engine 20. Likewise, the second platform 66 defines forward and aft (axial) sides 66a/66b, first and second circumferential mate faces 66c/66d, a gaspath side 66e, and a non-gaspath side 66f.

The platforms 64/66 further include respective curved radial flanges 70 that project (radially) from the non-gaspath sides 64f/66f. As shown, the flanges 70 on each of the platforms 64/66 are single, exclusive flanges (i.e. there are no other flanges). The flanges 70 are continuous between their terminal ends 70a/70b and generally run from a location at or near the mate face 64c/66c, toward the other mate face 64d/66d, around the suction side 68d of the airfoil section 68, to a location at or near the forward side 64a/66a. The flanges 70 in the illustrated example are generally of constant thickness (between faces 70g and 70h). It is to be understood that although this example shows that both platforms 64/66 have the flanges 70, that one or the other of the platforms 64/66 may alternatively have a flange of a different configuration. Thus, at least one of the platforms 64/66 has the flange 70.

Each of the radial flanges 70 is made up of three leg portions, designated at 70c/70d/70e. For the given orientation of the airfoil section 68, the first leg portions 70c begin at the terminal ends 70a adjacent the trailing edge 68b of the airfoil section 68 and extend toward the second mate faces 64d/66d. The second leg portions 70d extend from the first leg portions 70c and curve around the suction side 68d of the airfoil section 68. For example, the curvature of the second leg portions 70d generally follows the shape of the suction side 68d. The third leg portions 70e extend from the second leg portions 70d toward the forward sides 64a/66a. Relative to the local longitudinal direction of the flange 70 at its terminal ends, the flange 70 curves 80 degrees or more. As will be appreciated, if the airfoil section 68 were flipped in orientation such that suction side 68d was facing toward the mate faces 64c/66c and the pressure side 68c was facing toward the mate faces 64d/66d, the flanges 70 would also be flipped such that they still curve around and generally follow the suction side 68d.

In this example, the first leg portions 70c are substantially straight, the second leg portions 70d are curved, and the third leg portions 70e are substantially straight. The boundaries where the first leg portions 70c end and the second leg portions 70d begin, and where the second leg portions 70d end and the third leg portions 70e begin, are at inflections where the flanges 70 curve. In one further example, one or both of the first leg portions 70c are substantially parallel to the aft sides 64a/66a, and one or both of the third leg portions 70e are substantially parallel to the second circumferential sides 64d/66d. The parallel orientations facilitate segregation of loads, which may facilitate the airfoil design process. For example, because the first leg portions 70c are parallel to the aft sides 64a/66a they transmit primarily axial loads. Likewise, because the third leg portion or portions 70e are parallel to the second circumferential sides 64d/66d they transmit primarily tangential loads. If non-parallel, the first leg portions 70c may transmit some tangential load, and the third leg portions 70e may transmit some axial load.

The flanges 70 each also define a radial face 70f, an inside face 70g (facing the airfoil section 68), and an outside face 70h (facing toward the second mate face 64d/66d). Although the radial heights of the flanges 70 could vary over their lengths, in the illustrated example the heights are substantially uniform from end 70a to end 70b and are approximately equal to the radial thickness of the platforms 64/66.

The airfoil piece 62 is continuous in that the platforms 64/66 and airfoil section 68 constitute a one-piece body. As an example, the airfoil piece 62 is formed of a ceramic material, an organic matrix composite (OMC), or a metal matrix composite (MMC). For instance, the ceramic material is a ceramic matrix composite (CMC) that is formed of ceramic fibers that are disposed in a ceramic matrix. The ceramic matrix composite may be, but is not limited to, SiC fiber in SiC matrix, carbon fiber in carbon matrix, SiC fiber in carbon matrix, carbon fiber in SiC matrix, or oxide fiber in oxide matrix. Example organic matrix composites include, but are not limited to, glass fiber, carbon fiber, and/or aramid fibers disposed in a polymer matrix, such as epoxy or polyimide. Example metal matrix composites include, but are not limited to, boron carbide fibers and/or alumina fibers disposed in a metal matrix, such as aluminum.

Referring again to FIG. 2, the vane arc segment 60 further includes a spar 72 that extends through the through-cavity 65 and mechanically supports the airfoil piece 62. The spar 72 includes a spar platform 72a and a spar leg 72b that extends from the spar platform 72a into the through-cavity 65. Although not shown, the spar platform 72a includes attachment features that secure it to a fixed support structure, such as an engine case. The spar leg 72b defines an interior through-passage 72c.

Cooling air, such as bleed air from the compressor section 24, is conveyed into and through the through-passage 72c of the spar 72. This cooling air is destined for a downstream cooling location, such as a tangential onboard injector (TOBI). Cooling air may also be provided into cavity 65 in the gap between the airfoil wall 63 and the spar leg 72b. The through-passage 72c is fully or substantially fully isolated from the gap. Thus, the cooling air in the through-passage 72c does not intermix with cooling air in the gap.

Figure 5:
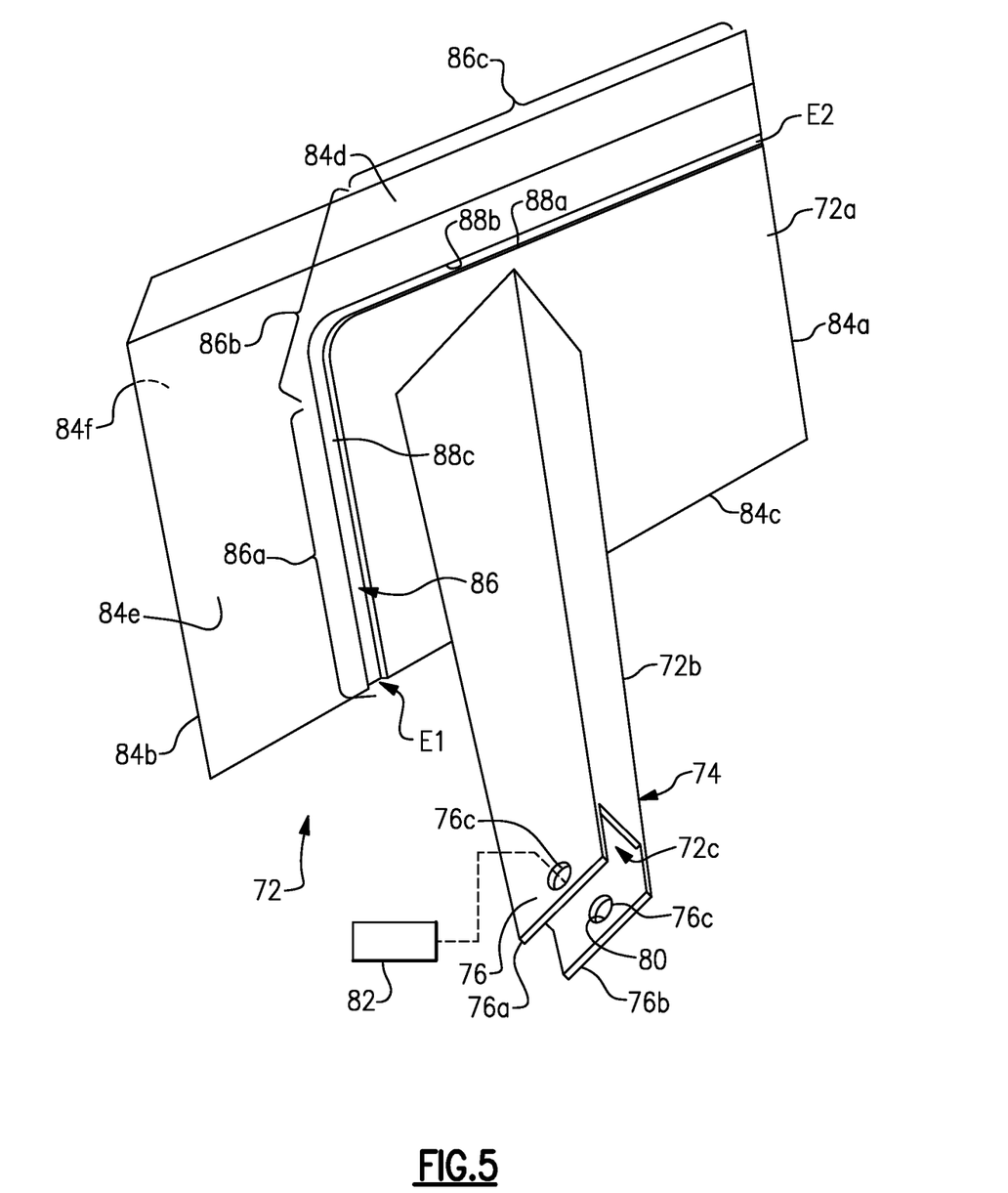
FIG. 5 illustrates an isolated view of a spar of the vane arc segment.

FIG. 5 illustrates an isolated view of the spar 72. The spar leg 72b has a distal end portion 74 that has a clevis mount 76. As shown, the clevis mount 76 includes first and second prongs 76a/76b that have respective pin holes 76c that are coaxially aligned with each other. The pin 82 is disposed in the pin holes 76c. The prongs 76a/76b are spaced apart so as to form a forked configuration. The through-passage 72c of the spar leg 72b extends between the prongs 76a/76b. The clevis mount 76 thus also serves as an outlet of the through-passage 72c. The end portion 74 of the spar leg 72b extends past the platform 68 of the airfoil fairing 62 so as to protrude from the airfoil piece 62.

There is a support platform 78 (FIG. 2) adjacent the platform 68 of the airfoil piece 62. The support platform 78 (see also isolated view in FIG. 6) includes a through-hole 80 through which the end portion 74 of the spar leg 72b extends such that the clevis mount 76 protrudes from the support platform 78. The pin 82 of the clevis mount 76 is wider than the through-hole 80. The ends of the pin 82 thus abut the face of the support platform 78 and thereby prevent the spar leg 72b from being retracted from the through-hole 80. The pin 82 thus locks the support platform 78 to the spar leg 72b such that the airfoil piece 62 is mechanically trapped between the spar platform 72a and the support platform 78. In this regard, the spar 72 and the support platform 78 serve as a support system for the airfoil piece 62. It is to be appreciated that the spar leg 72c could alternatively be excluded, and the airfoil piece 62 clamped between the spar platform 72a and the support platform 78. In that case, the support platform 78 would be secured to a fixed engine structure in order to trap the airfoil piece 62. In either example, however, with or without the spar leg 72c, the spar platform serves as a support platform.

Figure 6:
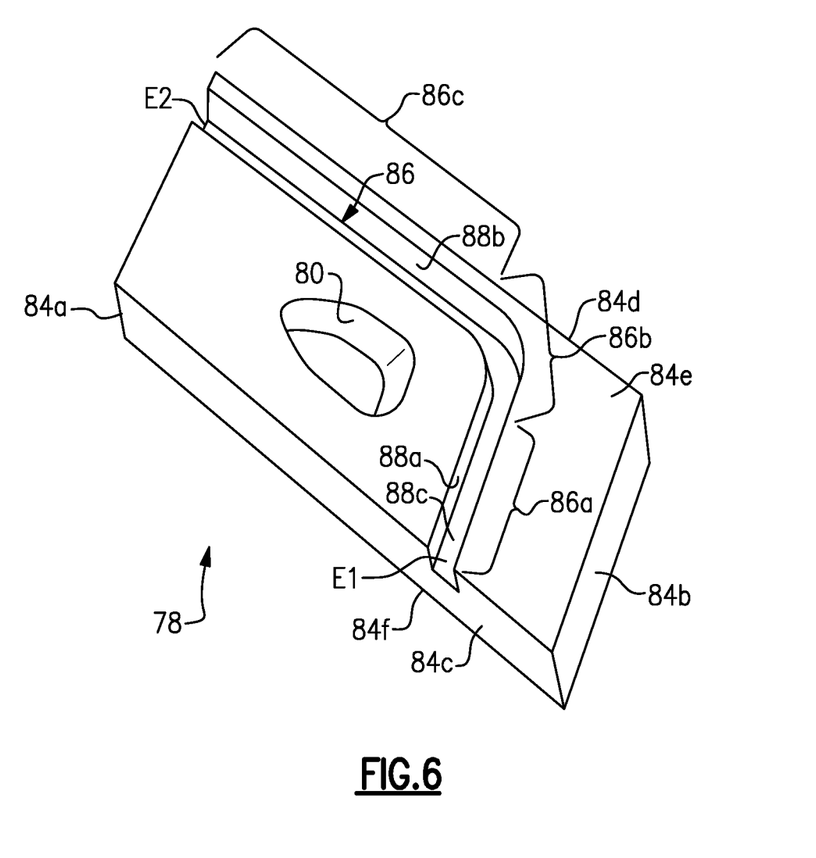
FIG. 6 illustrates an isolated view of a support platform of the vane arc segment.

The spar 72 and support platform 78 may be formed of a relatively high temperature resistance, high strength material, such as a single crystal metal alloy (e.g., a single crystal nickel- or cobalt-alloy). It is to be further appreciated that although the clevis mount is depicted this example for securing the spar leg 72b and support platform 78 together, that other mounting schemes may alternatively be employed to secure the spar leg 72c with the support platform 78.

Each of the support platform 78 and the spar platform 72a (i.e., also a support platform) include a forward support platform side 84a, an aft support platform side 84b, a first support platform circumferential side 84c, a second support platform circumferential side 84d, an airfoil side 84e, and a non-airfoil side 84f. Each airfoil side 84e has a radial channel 86 therein for receiving the respective flange 70 of the airfoil piece 62. That is, the (first) channel 86 of the spar platform 72 receives the flange 70 of the platform 64 of the airfoil piece 62, and the (second) channel 86 of the support platform 78 receives the flange 70 of the platform 66 of the airfoil piece 62. As discussed above, one of the other of the platforms 64/66 may alternatively have a flange of a different configuration. In that case, the corresponding platform 72a/78 would have channel of a different configuration.

The channels 86 are generally rectangular in cross-section and define a first side 88a proximate the airfoil section 68, a second side 88b distal from the airfoil section 68, and a channel bottom 88c. The top of the channel 86 is open, and since the top opens in the radial direction relative to the bottom side 88c, the channel 86 is referred to herein as a "radial" channel.

The channels 86 are complementary in shape to the flanges 70. In this regard, each channel 86 includes a radial channel first leg portion 86a, a radial channel second leg portion 86b, and a radial channel third leg portion 86c. The first leg portion 86a extends adjacent the aft support platform side 84b and has a terminal end E1 that opens at the first circumferential side 84c. Similar to the first leg portion 70c of the flange 70, the first leg portion 86a of the channel 86 is substantially parallel to the aft support platform side 84b, and the third leg portion 86c is substantially parallel to the second support platform circumferential side 84d. The radial channel second leg portion 86b extends from the radial channel first leg portion 86a and curves toward the forward support platform side 84a. The radial channel third leg portion 86c extends from the second leg portion 86b toward the forward support platform side 84a and has a terminal end E2 that opens at the forward support platform side 84a. The portions 86a/86b/86c correspond to the leg portions 70c/70d/70e of the flange 70 such that leg portion 70c is received into channel portion 86a, leg portion 70d is received into channel portion 86b, and leg portion 70e is received into channel portion 86c. In this regard, the channel 86 is complementary in shape to the flange 70. It is to be understood that the flanges 70 are not identical in geometry (and thus the channels 86 are not be identical in geometry). Therefore, although the general shape of the flanges 70 are similar to each other, and the general shape of the channels 86 are similar to each other, the geometries of the above portions may differ from each other.

In general, support schemes for mounting structural vane segments formed of CMCs, OMCs, and MMCs are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of fiber-reinforced composites. Therefore, even though fiber-reinforced composites may have many potential benefits, such benefits cannot be realized without a suitable support scheme. In this regard, the flanges 70 and channels 86 serve as single support features to facilitate a low-stress mounting scheme.

Figure 7:
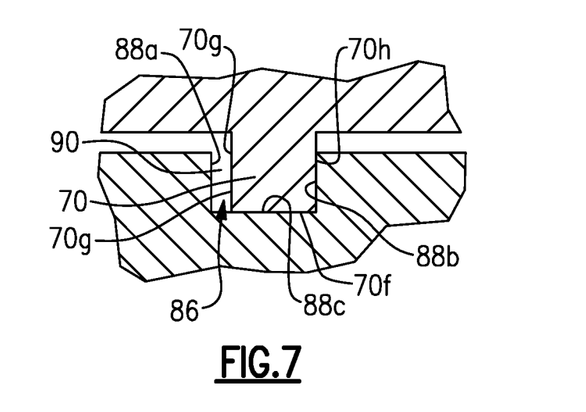
FIG. 7 illustrates a sectioned view of a radial flange in a radial channel of a support platform.

During operation of the engine 20 combustion gases flow across the airfoil section 68 and gaspath sides 64e/66e of the platforms 64/66. The flow causes aerodynamic loads on the vane arc segment 60. The aerodynamic loads are transmitted through the airfoil piece 62 to the spar 72 and support platform 78. In this regard, the flanges 70 serve as primary load-bearing features to transmit the loads via the channels 86 to the spar 72 and support platform 78. For example, the outer faces 70h of the flanges 70 along the circumferential sides 64d/66d serve as circumferentially-facing load faces that bear circumferential loads, the outer faces 70h that face in the aft direction serve as axial (aft) load faces that bear axial loads, and the radial faces 70f of the flanges serve as radial load faces that bear radial loads. As shown in FIG. 7, to transmit these loads, the outer face 70h of the flange 70 bears against the second side 88b of the channel 86, and the radial face 70f of the flange 70 bears against the bottom side 88c of the channel 86. For some mounting configurations, such as ring-strut-ring, radial loads may also be transmitted through both flanges 70, while in other mounting schemes, such as strut/spar designs, only the flange 70 of the second (inner) platform 66 may transmit radial loads.

As also shown in FIG. 7, the cross-section of the flange 70 is somewhat smaller in size than the cross-section of the channel 86. Thus, when the flange 70 bears against the second side 88b of the channel 86, there is an expansion gap 90 between the inner face 70g of the flange 70 and the first side 88a of the channel 86. As the name suggests, the expansion gap 90 provides space to accommodate thermal expansion and contraction as the components grow and shrink at differential temperatures. The gap 90 may also accommodate deflections and tolerances under load.

Figure 8:
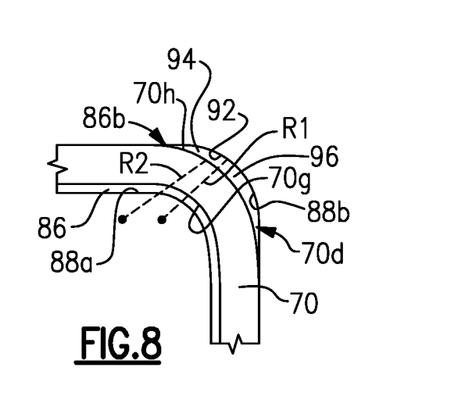
FIG. 8 illustrates a corner region of a radial flange and radial channel with a corner gap.

FIG. 8 illustrates a radial view in the vicinity of the second leg portion 70d of the flange 70 and the second leg portion 86b of the channel 86. The channel 86 defines a channel turn 92 and the flange 70 defines a flange turn 94. The channel turn 92 has a turn radius R1, and the flange turn 94 has a turn radius R2. R1 of the first one of the channels 86 may be independent of R1 of the second one of the channels 86, and R2 of the first one of the flanges 70 may be independent of R2 of the second one of the flanges 70. The channel turn radius R1 is less than the flange turn radius R2 such that the is a corner gap 96 between the second side 88b of the channel 86 and the outer side 70h of the flange 70. The channel gap 96 serves to provide additional space to accommodate thermal expansion. The channel gap 96 can be modified in size by modifying the radii R1 and R2, or even excluded if such additional expansion space is undesired.

The curved geometry of the flanges 70 facilitates avoidance of low angle corners that may otherwise concentrate stresses. Moreover, the flanges 70 also serve as stiffeners, thereby enhancing the stiffness and strength of the platforms 64/66. Such aerodynamic loads may also vary with engine cycles. The curvature of the flanges 70 facilitates distributing the varied loads. For example, the curved geometry of the flange 70 on the outer platform 64 acts as a stiffening rail. When loads are driven into the flange 70 and ultimately transmitted to the spar platform 72a, the stiffness facilitates distribution of the loads across the platform 64, as opposed to a "point load" scenario. Thus, the stress field may be more uniform. Additionally, the stiffness from the flanges 70 may also facilitate counteracting thermal mismatches with mating hardware and thereby reduce thermal loads.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane support system comprising:
    first and second support platforms for supporting an airfoil piece there between, each of the first and second support platforms defining a forward support platform side, an aft support platform side, a first support platform circumferential side, a second support platform circumferential side, an airfoil side, and a non-airfoil side, the first support platform having a hollow spar leg that extends therefrom, the second support platform having a through-hole through which an end portion of the hollow spar leg extends, and the end portion of the hollow spar leg is secured to the second support platform,
    the airfoil side of at least one of the first or second support platform having a radial channel therein for receiving a complementary radial flange of the airfoil piece, and
    the radial channel including a radial channel first leg portion extending adjacent the aft support platform side, a radial channel second leg portion extending from the radial channel first leg portion and curving toward the forward support platform side, and a radial channel third leg portion extending from the radial channel second leg portion toward the forward support platform side.

2. The vane support system as recited in claim 1, wherein the radial channel has terminal ends that open at, respectively, the first circumferential side and the forward side.

3. The vane support system as recited in claim 1, wherein the radial channel first leg portion is parallel to the aft support platform side.

4. The vane support system as recited in claim 3, wherein the radial channel third leg portion is parallel to the second support platform circumferential side.

5. The vane support system as recited in claim 1, wherein the radial channel of the first support platform is a single, exclusive radial channel of the first support platform, and the radial channel of the second support platform is a single, exclusive radial channel of the second support platform.

6. A vane arc segment comprising:
    an airfoil piece defining first and second airfoil platforms and an airfoil section extending between the first and second airfoil platforms, the airfoil section having a trailing edge, a leading edge, a pressure side, and a suction side, the first and second airfoil platforms each defining a first airfoil platform circumferential side, a second airfoil platform circumferential side, a forward airfoil platform side, and an aft airfoil platform side, a gaspath side, a non-gaspath side, and the non-gaspath side of at least one of the first or second airfoil platforms having a radial flange projecting there from, the radial flange extending continuously and including a flange first leg portion extending adjacent the trailing edge, a flange second leg portion extending from the flange first leg portion and curving around the suction side, and a flange third leg portion extending from the flange second leg portion toward the forward side,
    a vane support system including first and second support platforms supporting the airfoil piece there between, each of the first and second support platforms defining a support platform forward side, a support platform aft side, a first support platform circumferential side, a second support platform circumferential side, an airfoil side, and a non-airfoil side, and
    the airfoil side of at least one of the first or second support platforms having a radial channel therein, wherein the radial channel is complementary to the radial flange so as to receive the radial flange therein, the radial channel defining a first side proximate the airfoil section and a second side distal from the airfoil section, the radial flange bearing against the second side, and there is an expansion gap between the radial flange and the first side of the radial channel.

7. The vane arc segment as recited in claim 6, wherein the radial channel defines a channel turn having a channel turn radius R1, and the radial flange defines a flange turn having a flange turn radius R2, and R1 is less than R2 such that the is a corner gap between the radial channel at the flange turn and the second side of the radial channel at the channel turn.

8. The vane arc segment as recited in claim 6, wherein the airfoil piece is ceramic matrix composite.

9. The vane arc segment as recited in claim 6, wherein the first support platform has a hollow spar leg that extends therefrom, and an end portion of the hollow spar leg is secured to the second support platform.

10. The vane arc segment as recited in claim 9, wherein the second support platform has a through-hole through which the end portion of the hollow spar leg extends.

11. The vane arc segment as recited in claim 6, wherein the radial channel has terminal ends that open at, respectively, the first support platform circumferential side and the support platform forward side.

12. The vane arc segment as recited in claim 6, wherein the flange first leg portion is parallel to the aft support platform side.

13. The vane arc segment as recited in claim 12, wherein the flange third leg portion is parallel to the second support platform circumferential side.

14. The vane arc segment as recited in claim 6, wherein the radial channel is a single, exclusive radial channel of the first or second support platform.

15. The vane arc segment as recited in claim 14, wherein the first support platform has a hollow spar leg that extends therefrom, the second support platform has a through-hole through which an end portion of the hollow spar leg extends, and the end portion of the hollow spar leg is secured to the second support platform.

16. A gas turbine engine comprising:
a compressor section;
a combustor in fluid communication with the compressor section; and
a turbine section in fluid communication with the combustor, the turbine section having vane arc segments disposed about a central axis of the gas turbine engine, each of the vane arc segments includes:
an airfoil piece defining first and second airfoil platforms and an airfoil section extending between the first and second airfoil platforms, the airfoil section having a trailing edge, a leading edge, a pressure side, and a suction side, the first and second airfoil platforms each defining a first airfoil platform circumferential side, a second airfoil platform circumferential side, a forward airfoil platform side, an aft airfoil platform side, a gaspath side, a non-gaspath side, and the non-gaspath side of at least one of the first or second support platforms having a radial flange projecting there from, the radial flange extending continuously and including a flange first leg portion extending adjacent the trailing edge, a flange second leg portion extending from the flange first leg portion and curving around the suction side, and a flange third leg portion extending from the flange second leg portion toward the forward side,
a vane support system including first and second support platforms supporting the airfoil piece there between, each of the first and second support platforms defining a support platform forward side, a support platform aft side, a first support platform circumferential side, a second support platform circumferential side, an airfoil side, and a non-airfoil side,
the airfoil side of at least one of the first or second support platforms having a radial channel therein, wherein the radial channel is complementary to the radial flange so as to receive the radial flange therein, and
the radial channel including a radial channel first leg portion extending adjacent the aft support platform side, a radial channel second leg portion extending from the radial channel first leg portion and curving toward the forward support platform side, and a radial channel third leg portion extending from the radial channel second leg portion toward the forward support platform side, wherein the radial channel first leg portion is parallel to the aft support platform side.

17. The gas turbine engine as recited in claim 16, wherein the radial channel third leg portion is parallel to the second support platform circumferential side.

18. The gas turbine engine as recited in claim 16, wherein the radial channel has terminal ends that open at, respectively, the first support platform circumferential side and the support platform forward side.

19. The gas turbine engine as recited in claim 16, wherein the first support platform has a hollow spar leg that extends therefrom, the second support platform has a through-hole through which an end portion of the hollow spar leg extends, and the end portion of the hollow spar leg is secured to the second support platform.

* * * * *